(12) United States Patent
Morinaga et al.

(10) Patent No.: US 8,982,502 B2
(45) Date of Patent: Mar. 17, 2015

(54) HARD DISK DRIVE WITH WRITE ASSIST BASED ON DETECTED CONDITIONS

(75) Inventors: Akira Morinaga, Chigasaki (JP); Nobumasa Nishiyama, Yokohama (JP); Keiichi Nagasaka, Isehara (JP)

(73) Assignee: HGST Netherlands B.V., Amsterdam (NL)

( * ) Notice: Subject to any disclaimer, the term of this patent is extended or adjusted under 35 U.S.C. 154(b) by 276 days.

(21) Appl. No.: 13/323,704

(22) Filed: Dec. 12, 2011

(65) Prior Publication Data

US 2013/0148234 A1   Jun. 13, 2013

(51) Int. Cl.
G11B 5/60 (2006.01)

(52) U.S. Cl.
USPC .............................................. 360/75; 360/71

(58) Field of Classification Search
CPC .............. G11B 5/54; G11B 5/58; G11B 5/60; G11B 5/6005; G11B 5/6011; G11B 5/607; G11B 5/6082; G11B 5/02; G11B 21/02
USPC ........ 360/30, 55, 71, 75, 234.3, 234.4, 235.4, 360/244.1
See application file for complete search history.

(56) References Cited

U.S. PATENT DOCUMENTS

| | | | |
|---|---|---|---|
| 6,004,030 A * | 12/1999 | Abraham et al. ................... | 374/1 |
| 6,014,281 A | 1/2000 | Contreras | |
| 7,221,529 B2 * | 5/2007 | Otsuki et al. ..................... | 360/46 |
| 7,457,073 B2 | 11/2008 | Kurita et al. | |
| 7,652,840 B2 * | 1/2010 | Henry et al. ..................... | 360/75 |
| 7,684,153 B2 | 3/2010 | Ohtsu et al. | |
| 7,729,079 B1 * | 6/2010 | Huber .............................. | 360/75 |
| 7,791,829 B2 | 9/2010 | Takeo et al. | |
| 7,969,681 B2 | 6/2011 | Satoh et al. | |
| 2002/0051315 A1 * | 5/2002 | Mundt et al. ................... | 360/135 |
| 2005/0046985 A1 * | 3/2005 | Morinaga et al. ............... | 360/31 |
| 2006/0139789 A1 * | 6/2006 | Yang .............................. | 360/75 |
| 2008/0192379 A1 | 8/2008 | Kurita et al. | |
| 2009/0059418 A1 | 3/2009 | Takeo et al. | |
| 2009/0122444 A1 * | 5/2009 | Ma et al. ..................... | 360/97.02 |
| 2009/0213483 A1 | 8/2009 | Matsui et al. | |
| 2009/0213486 A1 | 8/2009 | Takahashi | |
| 2009/0225461 A1 | 9/2009 | Aoki | |
| 2009/0310244 A1 | 12/2009 | Shimazawa et al. | |
| 2009/0310246 A1 * | 12/2009 | Takahashi ........................ | 360/75 |
| 2009/0316303 A1 * | 12/2009 | Yamada et al. ............ | 360/234.3 |

(Continued)

OTHER PUBLICATIONS

Okamura, H., "Structure and Application of a Hard Disk Drive," CQ Publishing Co., Ltd., May 1, 2002, pp. 153-155 (non-translated).

*Primary Examiner* — Thomas Alunkal
(74) *Attorney, Agent, or Firm* — Zilka-Kotab, PC

(57) ABSTRACT

In one embodiment, a hard disk drive includes a magnetic disk medium, a magnetic head adapted for writing data to the magnetic disk medium, a mechanism (such as a detection circuit) adapted for detecting at least one recording condition of drive current provided to the magnetic head during writing operations, and an energy conversion element for controlling at least one recording characteristic of the magnetic head in response to the at least one detected recording condition. According to another embodiment, a method includes writing data to a magnetic medium using a magnetic head, detecting at least one recording condition of drive current provided to the magnetic head during the writing, and controlling at least one recording characteristic of the magnetic head during the writing using an energy conversion element in response to the at least one detected recording condition.

19 Claims, 11 Drawing Sheets

(56) References Cited

U.S. PATENT DOCUMENTS

| | | |
|---|---|---|
| 2010/0134922 A1 | 6/2010 | Yamada et al. |
| 2010/0232053 A1 | 9/2010 | Yano et al. |
| 2011/0038081 A1 | 2/2011 | Contreras et al. |
| 2011/0149428 A1 | 6/2011 | Franca-Neto et al. |

\* cited by examiner

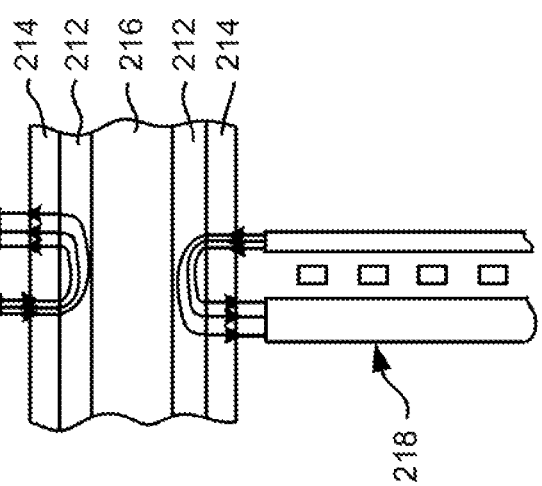
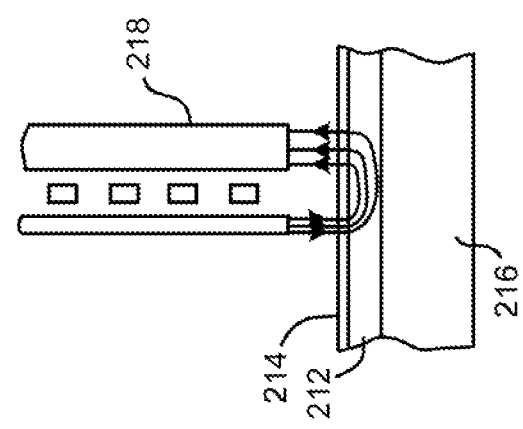
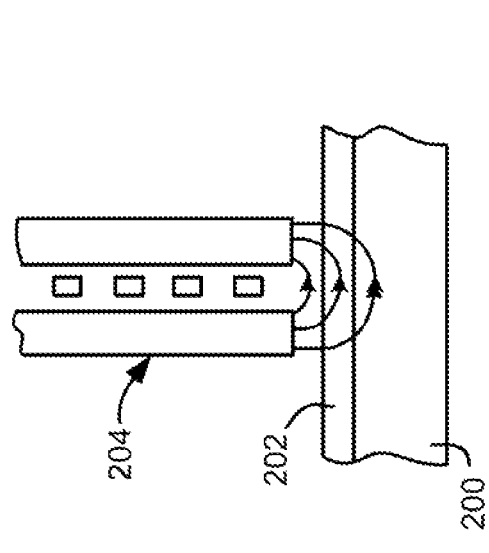
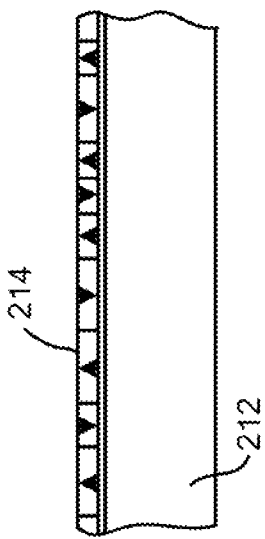
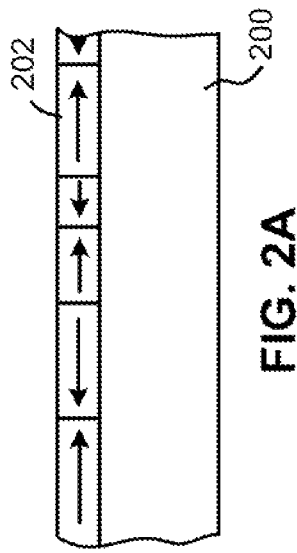

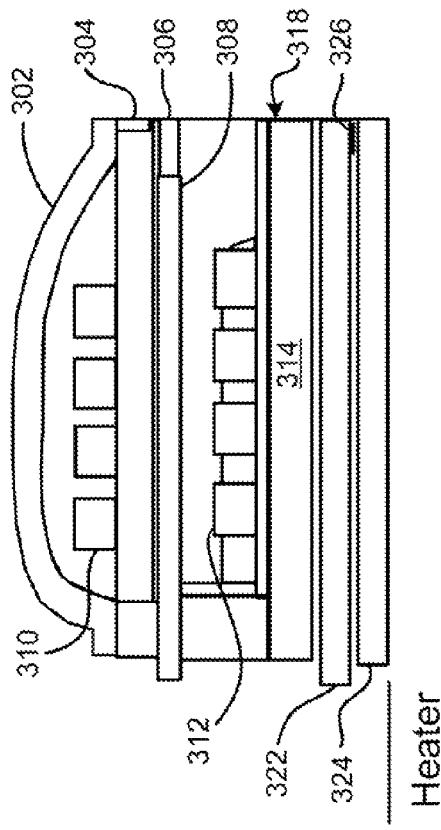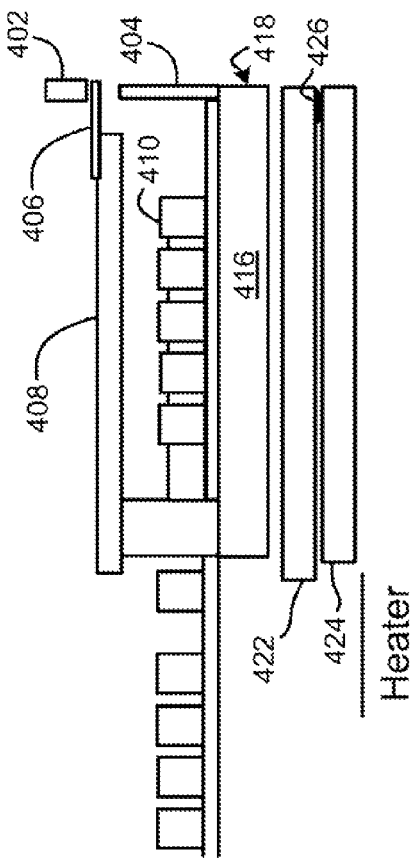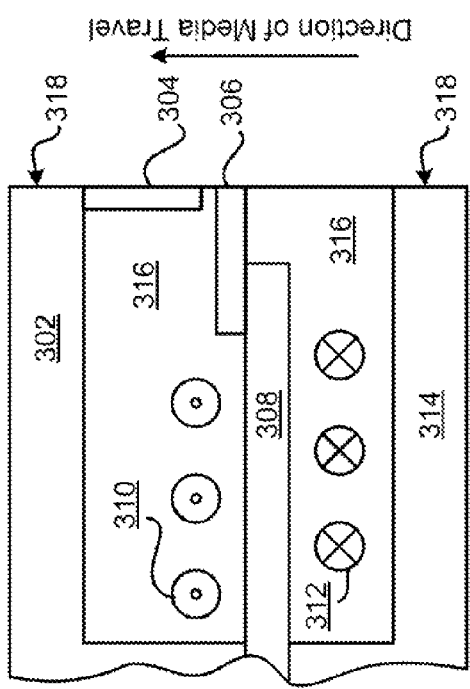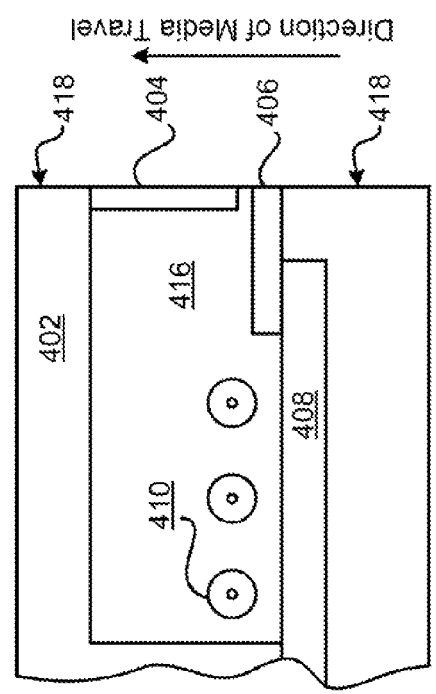

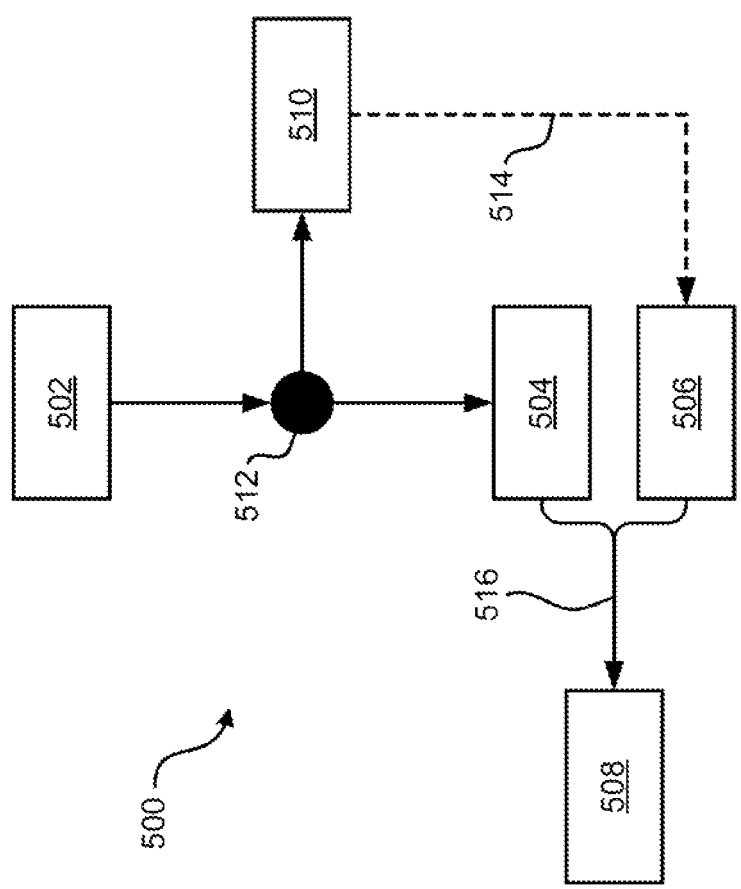

US 8,982,502 B2

HARD DISK DRIVE WITH WRITE ASSIST BASED ON DETECTED CONDITIONS

FIELD OF THE INVENTION

The present application relates to a magnetic disk drive having logic for assisted write operations corresponding to a writing condition of a magnetic head, and a mechanism adapted for conducting desired flying height control corresponding to the detected condition of the magnetic head.

BACKGROUND

The magnetic disk drive is indispensable in today's advanced information society as a device capable of recording huge quantities of data which can also allow the data to be stably read and written. One example of such as magnetic disk drive is a hard disk drive (HDD), common in personal computers and massive server installations. The magnetic disk drive is typically constructed from a magnetic recording medium (magnetic disk) for recording data thereto, a magnetic head for reading and writing the data, and circuit modules, such as a voice coil motor for driving the head, a channel integrated circuit (IC), a pre-amplifier, etc.

The magnetic head comprises a write head for writing data and a read head for reading the data recorded on the magnetic disk. Recently, in order to achieve a higher recording density of the data on the magnetic disk, HDDs having an assist mechanism using microwaves and methods which drive the assist element synchronized to the write signal have been proposed. The magnetic head reads and writes while moving above the magnetic disk at an extremely low flying height. To control the flying height, typically, a technique is used to improve the reliability of the magnetic disk drive. In some prior art methods, the flying-height control function measures the output resolution of the read head and uses this to capture changes in the stationary flying height caused by changes in the air pressure or changes in the ambient temperature. In practice, the structure of the write head, the shape of the flying surface of the slider, and the suspension are designed to set the stationary flying height, which is in the specifications. However, when a high-frequency signal is written (in particular), the flying height decreases due to expansion caused by the heating of the write head (write protrusion), and the head comes into contact with the disk medium. As a result, more precise control is necessary because of concern about reduced reliability of the drive caused by repeated head contact with the disk medium.

Currently, a heating element, such as a thermal flying-height control (TFC) or dynamic flying-height control (DFC) for controlling the flying height of the slider by applying power and intentionally causing thermal expansion is installed in the magnetic head and is used in flying-height control. One method carries out the control by synchronizing this heater to the write gate (WG) signal. From the perspective of control synchronized to the write signal, another structure uses a write-safe circuit using the signal induced in the read path by the write signal in the write path.

However, in any of these methods, it becomes difficult for a magnetic head to write a signal on a magnetic recording medium because the write magnetic field strength generated by the write head is reduced. Consequently, the quality of the signal obtained is degraded. Thus, a stronger assist becomes necessary as the signal frequency increases. On the other hand, when a high-frequency signal is written, the concerns are contact with the medium caused by the lower flying height due to the expansion (write protrusion) caused by the heating of the write head, data loss, damage to the head, and a drop in the reliability of the drive. Normally, the flying height is controlled to correspond to the changes in frequency in the radial direction of the magnetic recording medium, but is not controlled in the circumferential direction. Thus, a concern is that intermittent contact develops in sections in the circumferential direction and the signal quality degrades as a consequence of this contact.

SUMMARY

In one embodiment, a hard disk drive includes a magnetic disk medium, a magnetic head adapted for writing data to the magnetic disk medium, a mechanism adapted for detecting at least one recording condition of drive current provided to the magnetic head during writing operations, and an energy conversion element for controlling at least one recording characteristic of the magnetic head in response to the at least one detected recording condition.

In another embodiment, a hard disk drive includes a magnetic disk medium, a magnetic head adapted for writing data to the magnetic disk medium, a detection circuit adapted for detecting a recording condition of drive current provided to the magnetic head during writing operations, an energy conversion element for controlling a recording characteristic of the magnetic head in response to the detected recording condition, wherein the recording condition includes at least one of a signal frequency of the drive current, and a linear coefficient of a function of acceleration of the drive current, the detection circuit is adapted for applying a control voltage to the energy conversion element based on the detected recording condition, and the energy conversion element includes at least one of a thermal expansion element adapted for controlling a flying height distance between the magnetic head and the magnetic disk medium, wherein the thermal expansion element causes expansion of a portion of the magnetic head due to heat produced by the thermal expansion element, and a spin-torque oscillator (STO) adapted for assisting the magnetic head during writing operations by generating a high harmonic magnetic field from an external magnetic field produced by applying current to the STO.

According to another embodiment, a method includes writing data to a magnetic medium using a magnetic head, detecting at least one recording condition of drive current provided to the magnetic head during the writing, and controlling at least one recording characteristic of the magnetic head during the writing using an energy conversion element in response to the at least one detected recording condition.

Any of these embodiments may be implemented in a magnetic data storage system such as a disk drive system, which may include a magnetic head, a drive mechanism for passing a magnetic storage medium (e.g., hard disk) over the head, and a control unit electrically coupled to the head for controlling operation of the head.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

FIG. 5 shows a partial simplified schematic of a system, according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a hard disk drive includes a magnetic disk medium, a magnetic head adapted for writing data to the magnetic disk medium, a mechanism adapted for detecting at least one recording condition of drive current provided to the magnetic head during writing operations, and an energy conversion element for controlling at least one recording characteristic of the magnetic head in response to the at least one detected recording condition.

In another general embodiment, a hard disk drive includes a magnetic disk medium, a magnetic head adapted for writing data to the magnetic disk medium, a detection circuit adapted for detecting a recording condition of drive current provided to the magnetic head during writing operations, an energy conversion element for controlling a recording characteristic of the magnetic head in response to the detected recording condition, wherein the recording condition includes at least one of a signal frequency of the drive current, and a linear coefficient of a function of acceleration of the drive current, the detection circuit is adapted for applying a control voltage to the energy conversion element based on the detected recording condition, and the energy conversion element includes at least one of a thermal expansion element adapted for controlling a flying height distance between the magnetic head and the magnetic disk medium, wherein the thermal expansion element causes expansion of a portion of the magnetic head due to heat produced by the thermal expansion element, and a spin-torque oscillator (STO) adapted for assisting the magnetic head during writing operations by generating a high harmonic magnetic field from an external magnetic field produced by applying current to the STO.

According to another general embodiment, a method includes writing data to a magnetic medium using a magnetic head, detecting at least one recording condition of drive current provided to the magnetic head during the writing, and controlling at least one recording characteristic of the magnetic head during the writing using an energy conversion element in response to the at least one detected recording condition.

Figure 1:
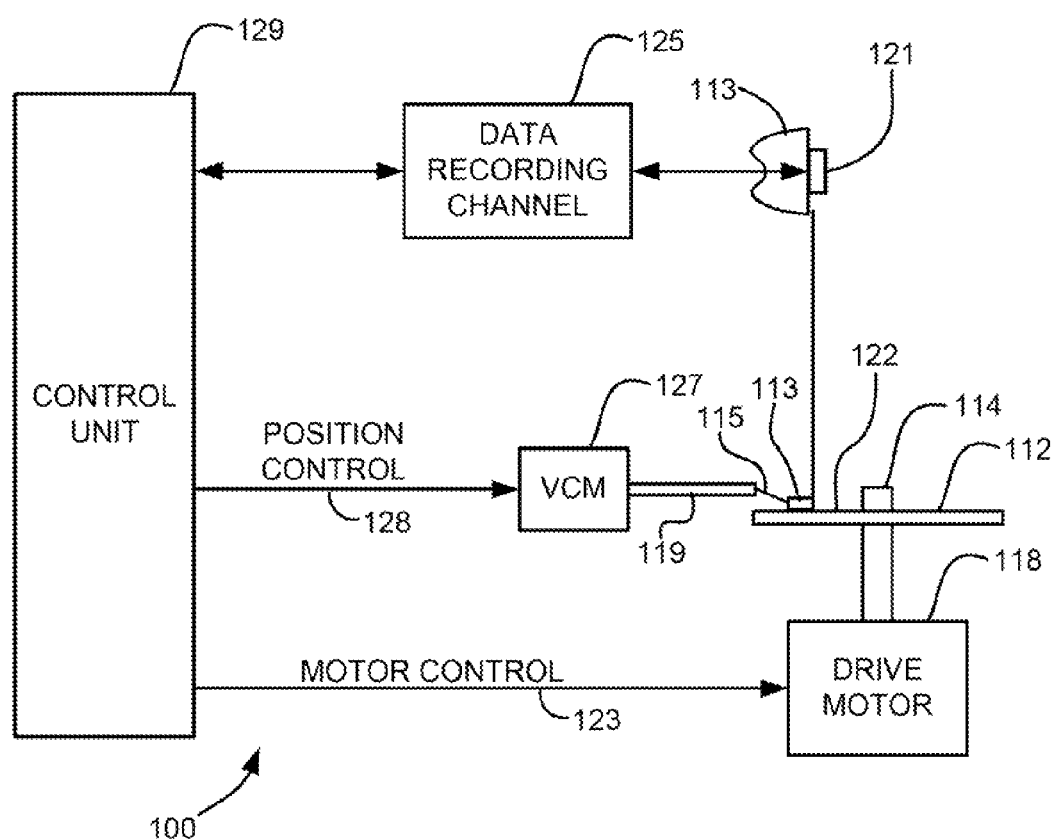
FIG. 1 is a simplified drawing of a magnetic recording disk drive system.

Referring now to FIG. 1, there is shown a disk drive 100 in accordance with one embodiment as disclosed herein. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 that exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion that extends from the ABS to a flare point and a yoke portion that extends from the flare point to the back gap. The flare point is where the second pole piece begins to widen (flare) to form the yoke. The placement of the flare point directly affects the magnitude of the magnetic field produced to write information on the recording medium.

According to one illustrative embodiment, a magnetic data storage system may comprise at least one magnetic head as described herein according to any embodiment, a magnetic medium, a drive mechanism for passing the magnetic medium over the at least one magnetic head, and a controller electrically coupled to the at least one magnetic head for controlling operation of the at least one magnetic head.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment that uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 that may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater element (Heater) may also be included in the magnetic heads shown in FIGS. 3A and 4A. The position of this heater may vary based on design parameters such as where the protrusion is desired, coefficients of thermal expansion of the surrounding layers, etc.

FIG. 5 is a schematic diagram showing a system 500, according to one embodiment. In this embodiment, a pre-amplifier 502 drives a magnetic head 504 (which may include a write head, a read head, a servo head, etc.) to write data on a magnetic recording medium 508 (e.g., the magnetic head is provided a signal 516 including the write data). Based on the write data, the pre-amplifier 502 generates a drive current 512 for the write head 504. The state of the drive current 512 for the write head 504, such as a signal frequency, a linear coefficient of a function of acceleration of drive current provided to the magnetic head (e.g., a rising edge of the write data), etc., may be detected by a mechanism 510, such as a detection circuit. This detection circuit 510 may be placed at any location from which it may detect at least one condition of write operations, such as installed in the preamplifier 502, on the magnetic head 504 or write head, on a flexible substrate, on a suspension, etc. Of course, any location as would be appreciated by one of skill in the art may be used.

In one approach, the detection circuit 510 generates an output signal 514 in response to the at least one condition of the drive current 512 for the write head 504. The output signal 514 appropriately controls drive current and control voltage provided to the magnetic head 514, such as delaying by using a controller to become signal 516. Similar to the spin-torque oscillator (STO) element for flying height control or the heating element, e.g., a thermal fly-height control (TFC) element or dynamic fly-height control (DFC) element, an energy conversion element 506 positioned near the magnetic head 514 uses the signal 516, which depends on the at least one condition of the drive current 512, to control while linking to the state of the drive current for the write head.

The heating element for flying-height control (TFC/DFC) may comprise tungsten (W), NiCr, or any other suitable material as would be known to one of skill in the art, and expands in proportion to an amount of electricity conducted and/or provided thereto. The expansion increases as the amount of electricity conducted increases. As a result, the flying height of the magnetic head above the magnetic disk medium may be controlled (either increased or decreased).

Figure 9:
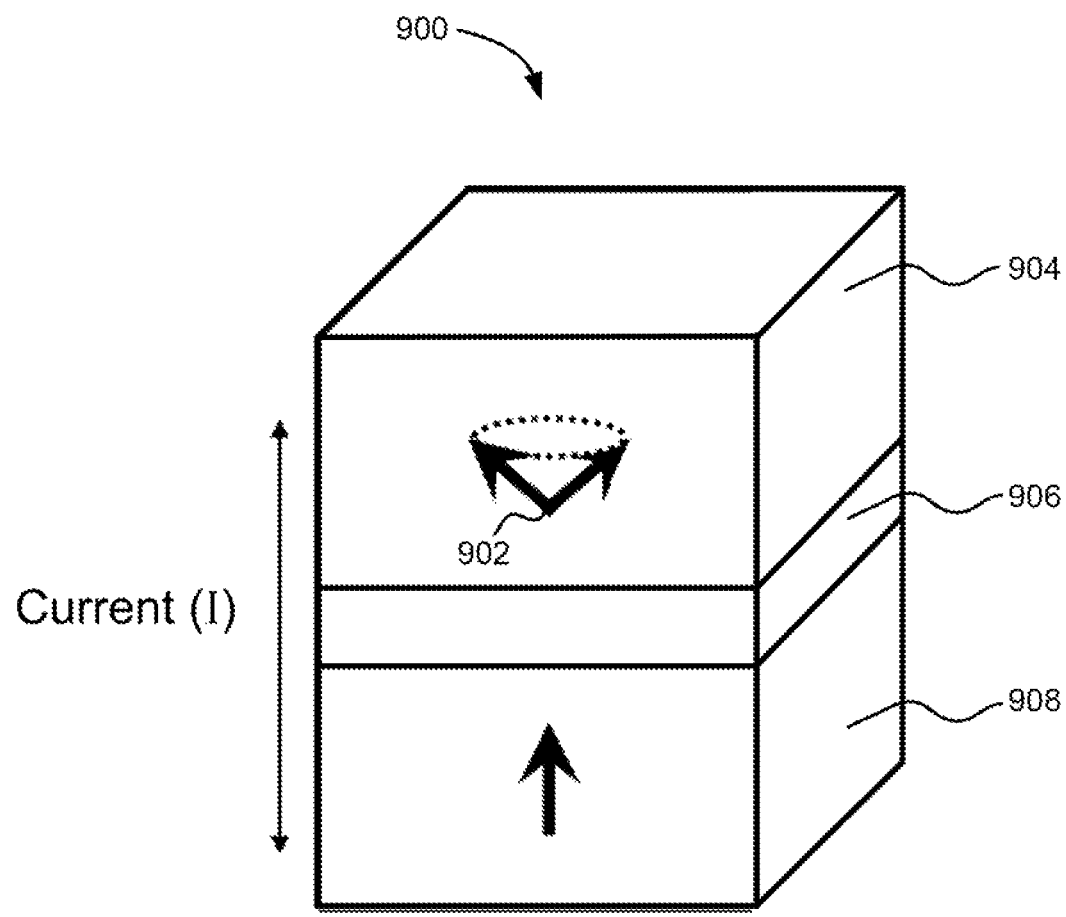
FIG. 9 shows a basic structure of a spin-torque oscillator (STO), according to one embodiment.

Referring now to FIG. 9, the STO element 900 may be constructed from a reference layer 908, a spacer 906 comprising a non-magnetic film, and a field generation layer (FGL) 904 thereabove, according to one embodiment. Of course, any STO structure may be used, as would be known to one of skill in the art. The FGL 904 may have in-plane anisotropy in one layer, perpendicular anisotropy in one layer, angular anisotropy in one layer, and/or may be a synthetic layer combining magnetic films having different directions of magnetization. The STO element 900 may be positioned in a gap of the write head, in one approach. The magnetization 902 in the FGL 904 generates microwaves from the write magnetic field generated by the drive current for the magnetic head and the STO drive current. The generated microwaves are absorbed by the magnetic recording medium. The magnetization of the medium is easily reversed by the magnetic resonance of the magnetization that facilitates recording.

In one embodiment, since when drive current flowing in the STO element 900 increases, the effect of the writing assist also increases. Therefore, the strength of the assisting effect may be controlled by varying the current flowing in the STO element 900 or the voltage flowing in the STO element 900, which is proportional to the current.

Because this relationship differs depending on the STO structure or the detected recording condition, the condition which obtains a good correlation between the current and voltage conditions and the assist intensity may be selected in preferred embodiments.

Referring again to FIG. 5, the pre-amplifier 502 may operate the magnetic head 504 by using the drive current 512 which was generated. In this case, writing operations of the magnetic head 514 may be assisted using the energy conversion element 506 by in response to the recording condition of the drive current 512. Thus, compared to a situation where no control is exerted, the signal may be written to the magnetic disk medium 508 in a recording state having higher quality, e.g., less error, better signal-to-noise ratio (SNR), etc.

Assistance by the energy conversion element may always be added under constant conditions independent of the recording condition of the drive current 512. However, the quality of the signal recorded on the magnetic disk medium 508 is improved by detecting either or both of the frequency and the rise state of the drive current as in this system 500 and conducting precise control that corresponds to changes in the recording performance. Conversely, power consumption by the drive may be reduced because unnecessary assists are not conducted. However, preferably, the detection circuit 510 may be turned on/off in order to have compatibility and affinity with conventional drive circuits. When the detection circuit 510 is turned on, appropriate control is conducted. When turned off, control at a constant voltage may be conducted similar to conventional technologies.

Figure 6A:
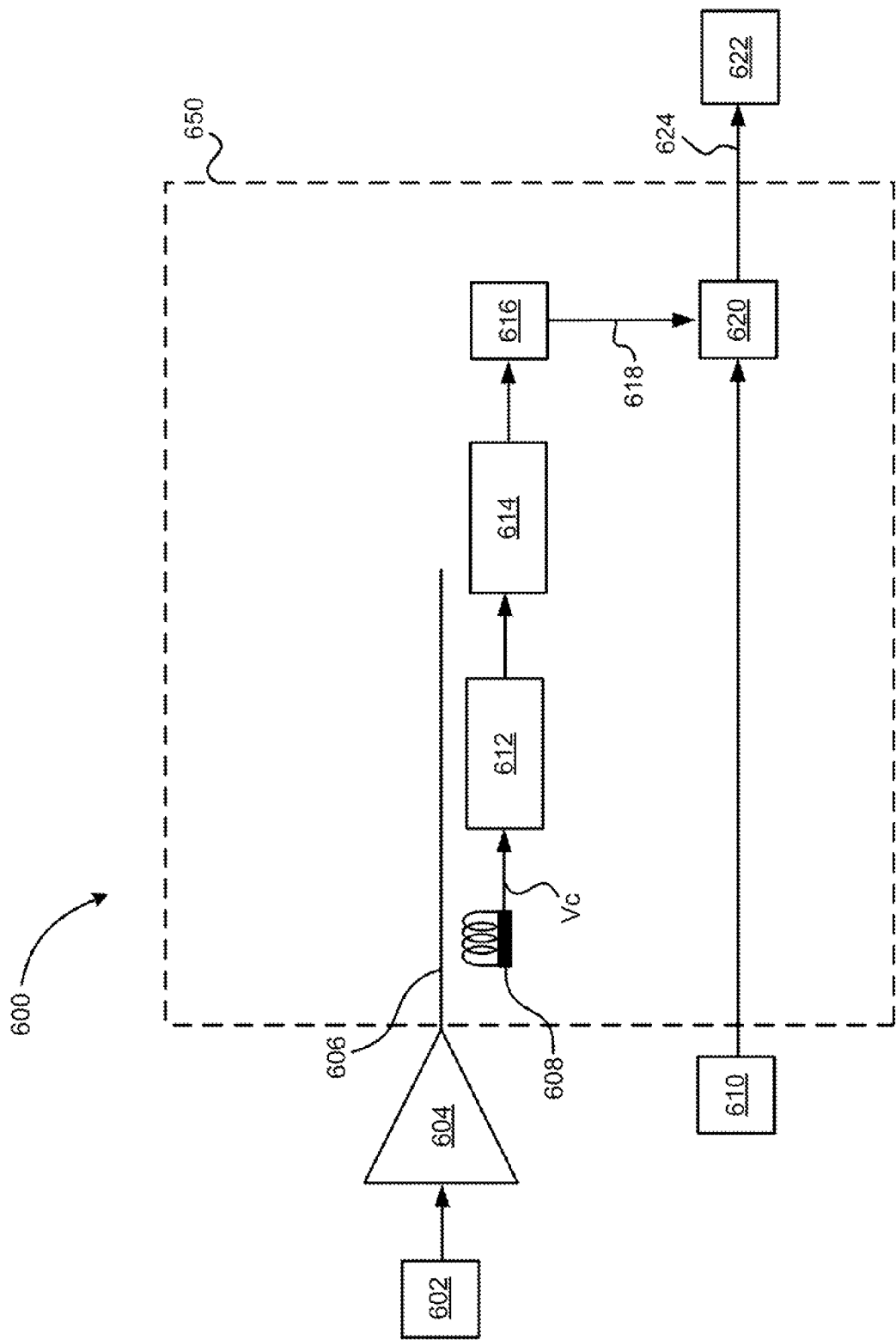
FIG. 6A shows a system for assisted magnetic writing according to one embodiment.

FIG. 6A shows a system 600 for assisted magnetic writing according to one embodiment. This system 600 is adapted for detecting a frequency of drive current 606 and controlling an energy conversion element 622. For example, a crosstalk circuit 608 may be used in the frequency detection. In this embodiment, the crosstalk between conductors (such as wires, channels, etc.) may be used to induce a voltage Vc proportional to the frequency of the input signal (drive current 606) and eventually become the output signal 624 which ultimately controls the energy conversion element 622.

FIG. 6A shows the input/output characteristics of the crosstalk circuit 608, according to one embodiment. By using this circuit, a voltage Vc proportional to the frequency of the pre-amplifier 604 may be obtained and used for control. Based on the write data 602, the signal amplified by the pre-amplifier 604 becomes the drive current 606 for the magnetic head. The circuit crosstalk circuit 608 may be placed adjacent to or near the drive current wire of the magnetic head so that it may detect the frequency of the drive current 606 for the magnetic head and output Vc proportional to the frequency of the drive current 606 of the magnetic head. After the output Vc is rectified by the commutation circuit 612, coefficient control 614 is conducted in order to fit the signal into an appropriate input range for the energy conversion element 622. In one approach, when the frequency is large, sign control 616 may determine whether the control voltage is large or small may be conducted to obtain a control voltage offset 618. The control voltage offset 618 is added to the initial control voltage 610 (which is the reference voltage) using an adding function 620, to produce the final control voltage 624 which is input to the energy conversion element 622 (and possibly a controller).

For example, in a situation where the energy conversion element 622 is a heating element for controlling the flying height distance, in coefficient control 614, when the frequency of the drive current 606 of the magnetic head is high, it is believed that a state is created in which the magnetic field strength of the write head is reduced, and satisfactory recording to the magnetic disk medium is not possible. In this case, the final control voltage 624 becomes larger than the initial control voltage 610 by making the coefficient positive, and satisfactory write-assist becomes possible. In addition, depending on the head structure, it is believed that a state is created in which a large protrusion is caused by the heating of the coil. Because the heating is substantial when the frequency of the drive current 606 of the write head greatly expands the write head in the direction of the surface facing the medium, the possibility of contact with the magnetic recording medium increases. Thus, in this case, the coefficient is set to a negative value in the coefficient control 614 and avoids too much of a decrease in the flying height and the reduction in reliability caused by contact. This coefficient control 614 may be freely changed by a user to correspond to the performance of the write head and the protrusion state.

When the frequency of the drive current 606 of the magnetic head is high, it is believed that a state is created in which the magnetic field strength of the write head decreases, and satisfactory recording to the magnetic recording medium is not possible. In this case, by setting the coefficient to a positive value using the coefficient control 614, the final control voltage 624 becomes larger than the initial control voltage 610 and satisfactory write-assist becomes possible. In this case, the negative sign does not have to be used. This coefficient control 614 may be freely changed by the user to correspond to the performance of the write head and the protrusion state.

As shown in FIG. 6A, a detection circuit 650 may comprise all of the components shown therein, according to one embodiment. Of course, more or less functionality may be included in the detection circuit 650, according to various embodiments, and as would be appreciated by one of skill in the art upon reading the present descriptions.

The energy conversion element 622 may be a TFC element, a STO element, or any other type of energy conversion element as would be appreciated by one of skill in the art. By adding a positive or a negative control voltage 618 to the element control voltage 610, which is the reference, the adjusted control voltage 624 is obtained.

Figure 8A:
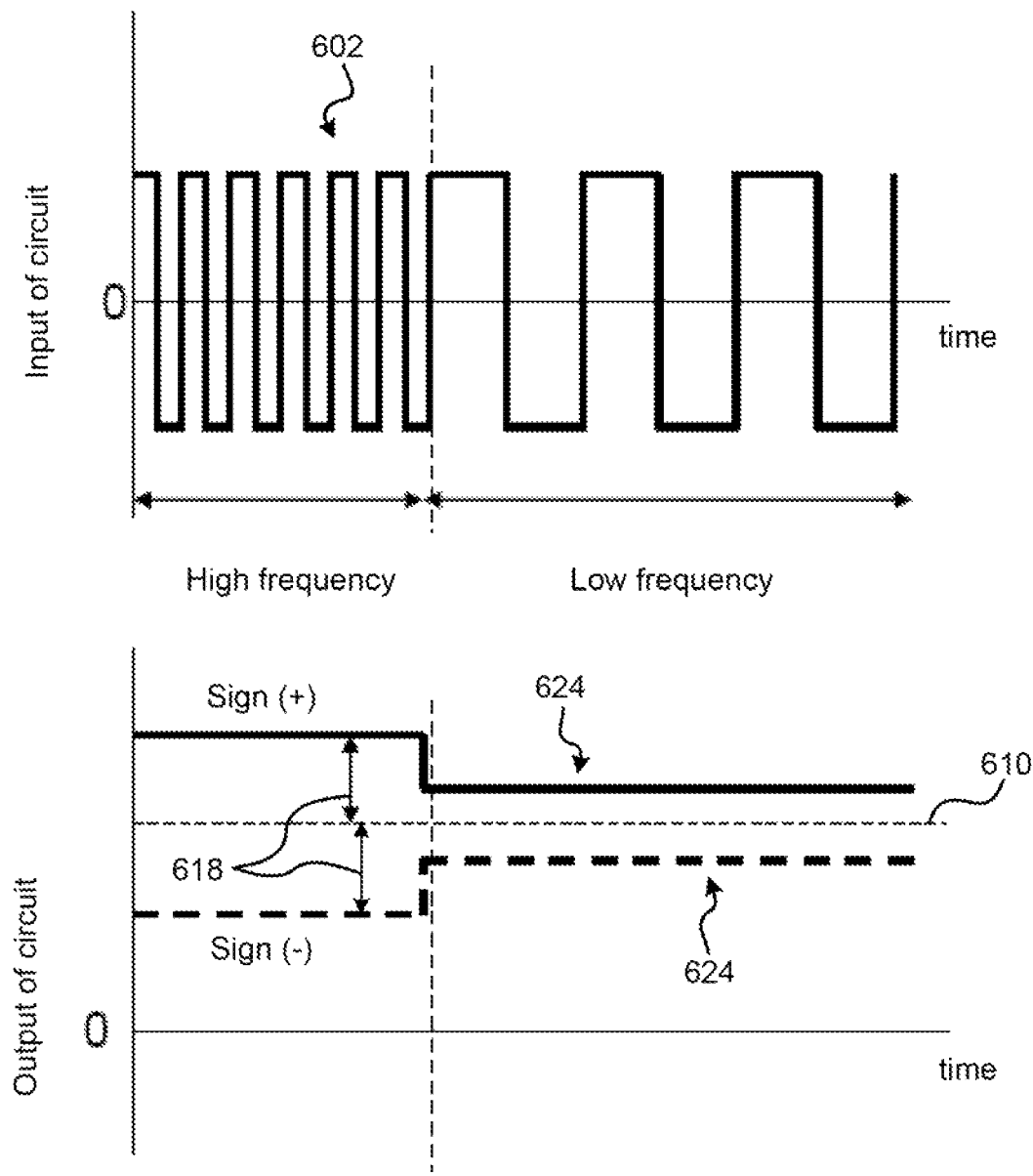
FIG. 8A shows simple charts that depict the change in the output corresponding to input of a circuit, according to one embodiment.

Referring now to FIG. 8A, the changes in the control voltage 618 with respect to the input signal 602 of the circuit 600 as shown in FIG. 6A, are shown according to one embodiment. As shown in FIG. 8A, when the frequency of the input signal 602 is higher, a strong control voltage 618 is output, e.g., the magnitude of the control voltage 618 is greater than when the frequency of the input signal 602 is lower. When the frequency of the input signal 602 is lower, a weaker control voltage 618 is output, but has a greater magnitude than the reference voltage 610 because the coefficient is positive. On the other hand, for a negative control voltage 618, when the frequency of the input signal 602 is higher, a weaker final control voltage 624 is output, because the coefficient is negative. When the frequency of the input signal 602 is lower, a stronger final control voltage 624 is output. Both voltages have a value lower than the reference voltage 610 due to the negative coefficient. Therefore, the absolute magnitude of the control voltage 618 is greater when the frequency of the input signal 602 is higher than when the frequency of the input signal 602 is lower, regardless of whether the control voltage 618 is positive (Sign (+)) or negative (Sign (−)).

In this way, the absolute magnitude of the control voltage 618 is proportional to the frequency of the input signal 602. Furthermore, the final control voltage 624 is derived from the reference voltage 610 ( ) the control voltage 618, depending on whether the control voltage 618 is positive or negative. Accordingly, when the sign of the control voltage 618 is negative (−) and the frequency of the input signal 602 becomes higher, the final control voltage 624 becomes weaker, and vice versa.

Referring again to FIG. 6A, the final control voltage 624 obtained by adding the control voltage 618 and the reference voltage 610 using the adding function 620 may be passed through a controller and appropriately delayed, and then input to the energy conversion element 622. In some approaches, the circuit 600 may have a structure that may be turned on/off, may control the energy conversion element 622 by a fixed value compatibility circuit using conventional technology, and may have compatibility and affinity with conventional drive circuits.

Figure 6B:
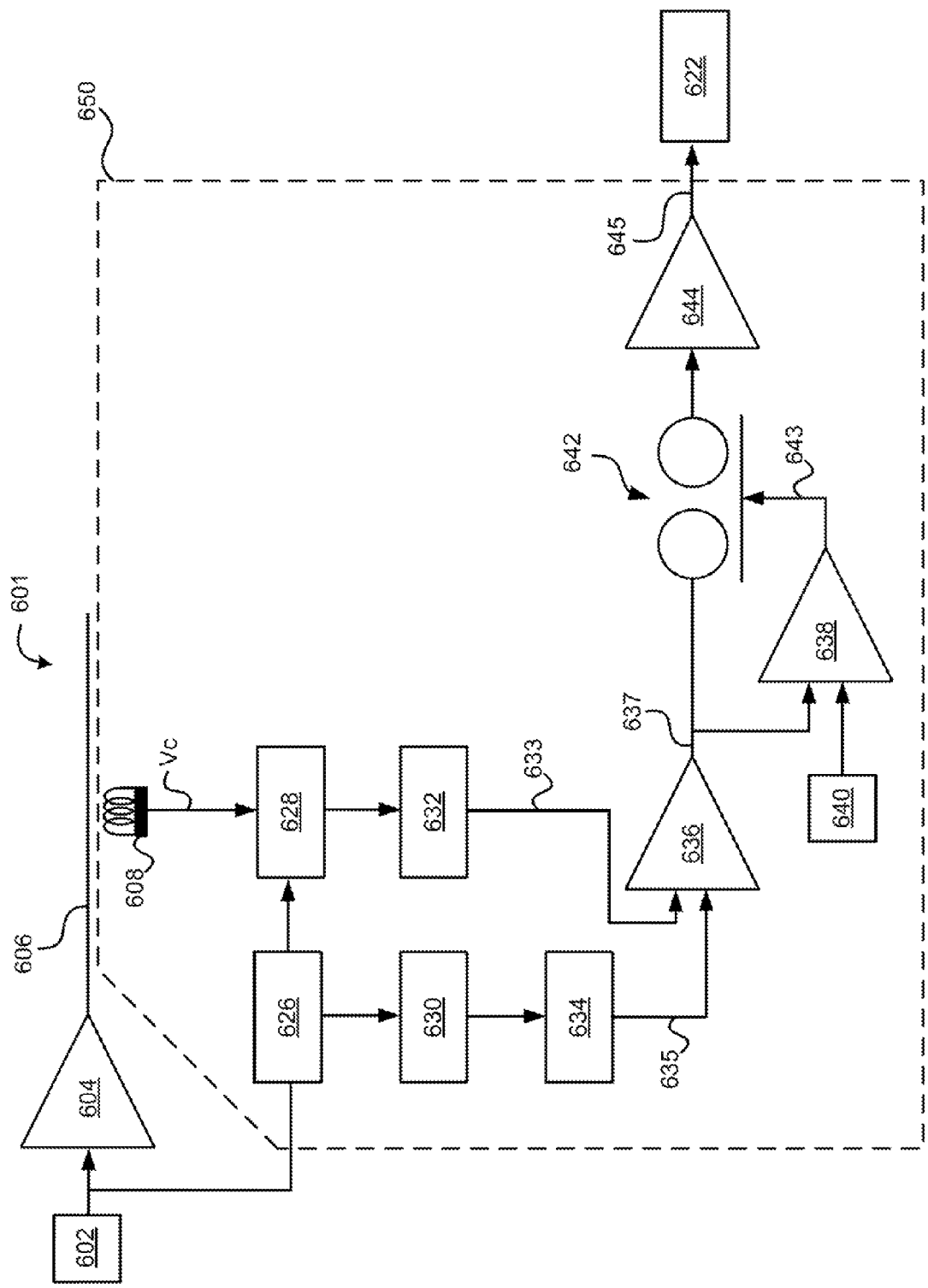
FIG. 6B shows a system for assisted magnetic writing according to one embodiment.

Next, referring to FIG. 6B, a system 601 is shown in which both the speed and the frequency of the rising edge of the write signal is simultaneously detected and the energy conversion element 622 is controlled. In one embodiment, the system 601 includes a detection circuit 650 which includes a phase-locked loop (PLL) circuit 626 and a frequency-voltage (FV) conversion element 630. The detection circuit 650 may be adapted for directly detecting the signal frequency of the drive current 606 from write data 602 provided to the magnetic head during writing operations.

For example, the PLL circuit 626 may be used to detect a frequency of the drive current 606 provided to the magnetic head. The signal frequency may be detected by directly taking the write data 602 into the PLL circuit 626. The detected frequency component is converted to a voltage by a frequency-voltage conversion circuit 630. Furthermore, threshold control 634 may be conducted based on the detected frequency component (from the voltage).

When the detected frequency is high, a strong assist may be used because the write performance of the write head is usually degraded. In contrast, when the frequency is low, a strong assist may be avoided because there is often a power consumption loss with a strong assist. The threshold control 634 increases the threshold value 635 when the frequency detected by the PLL circuit 626 is high, and decreases the threshold value 635 when the frequency is low. In addition, a crosstalk circuit 608 is placed adjacent to the wires carrying the drive current 606 for the write head generated by the pre-amplifier 604. The crosstalk between the wires is used to induce a voltage proportional to the frequency of the input signal that becomes the output signal Vc. The output signal may pass through a bandpass filter (BPF) 628 and the desired frequency component may be extracted. The desired frequency component is a harmonic signal having a multiple (such as three times) of the frequency of the frequency component detected by the PLL circuit 626, and indicates a speed of the rise of the signal component, also referred to as a linear coefficient of a function of acceleration of the drive current which relates to the steepness of the rising edge of the speed of the rise of the drive current. The result that is obtained is passed through the integrator 632 and gets integrated.

Next, the value 633 obtained and the threshold signal 635 are compared using a comparator 636. The difference (voltage) 637 between the two is taken in by a second comparator 638 for comparing to a reference voltage 640. This comparison between the difference voltage 637 and the reference voltage 640 may be used to determine whether to use the assist voltage 645 or not, as described later. Based on the comparison, a comparison signal 643 may be provided to a switch 642 to determine a position of the switch 642, in one embodiment. Finally, the voltage 637 is amplified using an amplifier 644 in order to fit into an appropriate input range for the energy conversion element 622. The signal 645 obtained by the amplification may be input into a controller, in some embodiments, or may be input directly to the energy conversion element 622, which may be controlled using this signal 645.

Figure 8B:
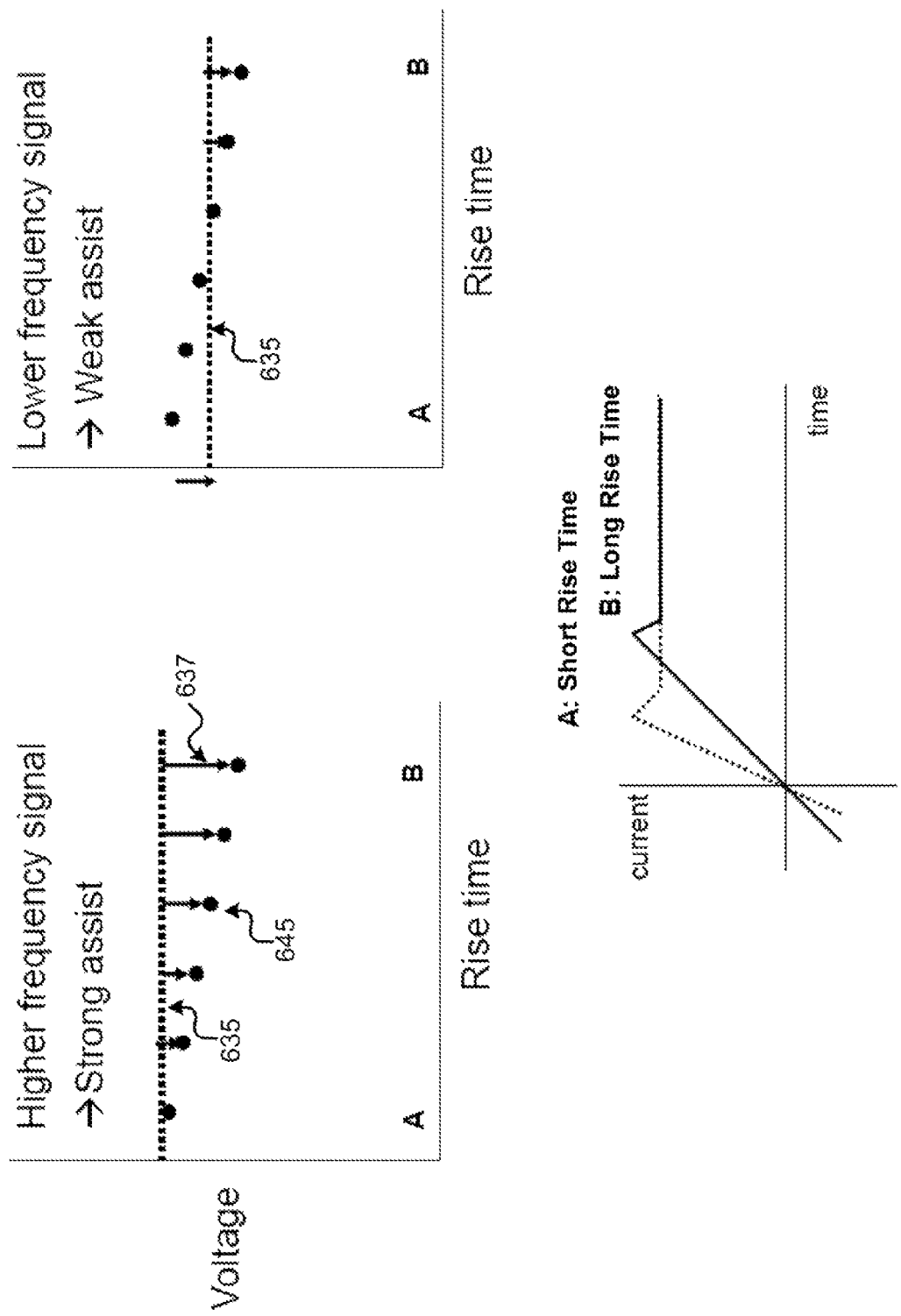
FIG. 8B shows a method which controls the control voltage of the energy conversion element based on a threshold difference corresponding to the rising edge and the frequency of the recording current, according to one embodiment.

As shown in FIG. 8B, according to one embodiment, there is a relationship between the threshold value 635 and the signal 645. It is important to change the assist strength when the rise of the write drive current is fast, and the rise time is short (A). It is also important to change the assist strength when the rise is slow and a relatively long time is needed (B). In the charts shown in FIG. 8B, the horizontal axis is the rise time, and the rise time lengthens in the A to B transition, and the detected third harmonic component becomes smaller.

First, when the signal frequency is high, the threshold value 635 should be set to a high value. On the other hand, when the signal frequency is low, as shown in the chart to the right, the threshold value 635 should be set to a low value. As the difference voltage 637 of the third harmonic component 633 subtracted from the detected threshold value 635 becomes a large positive value, a strong assist may be added, and if the difference voltage 637 is zero or negative, the assist may be not added, e.g., when the signal frequency is high, the threshold value 635 is high, and a strong assist is added; and when the signal frequency is low, the threshold value 635 is low, and a weak assist is added or no assist at all.

Referring again to FIG. 6B, the system 601 may turn on/off the assist and limit power consumption when the recording performance is satisfactory, such as when the recording frequency is sufficiently low, and the rising edge of the recording current is sufficiently steep. This may be implemented using a switch 642, in one embodiment. Of course, any type of on/off functionality may be implemented as would be understood by one of skill in the art. When the difference voltage 637 is 0 or negative, the assist may be turned off by turning off the switch 642. When the difference voltage 637 is positive, the assist voltage may be added by keeping or turning the switch 642 on.

Figure 8C:
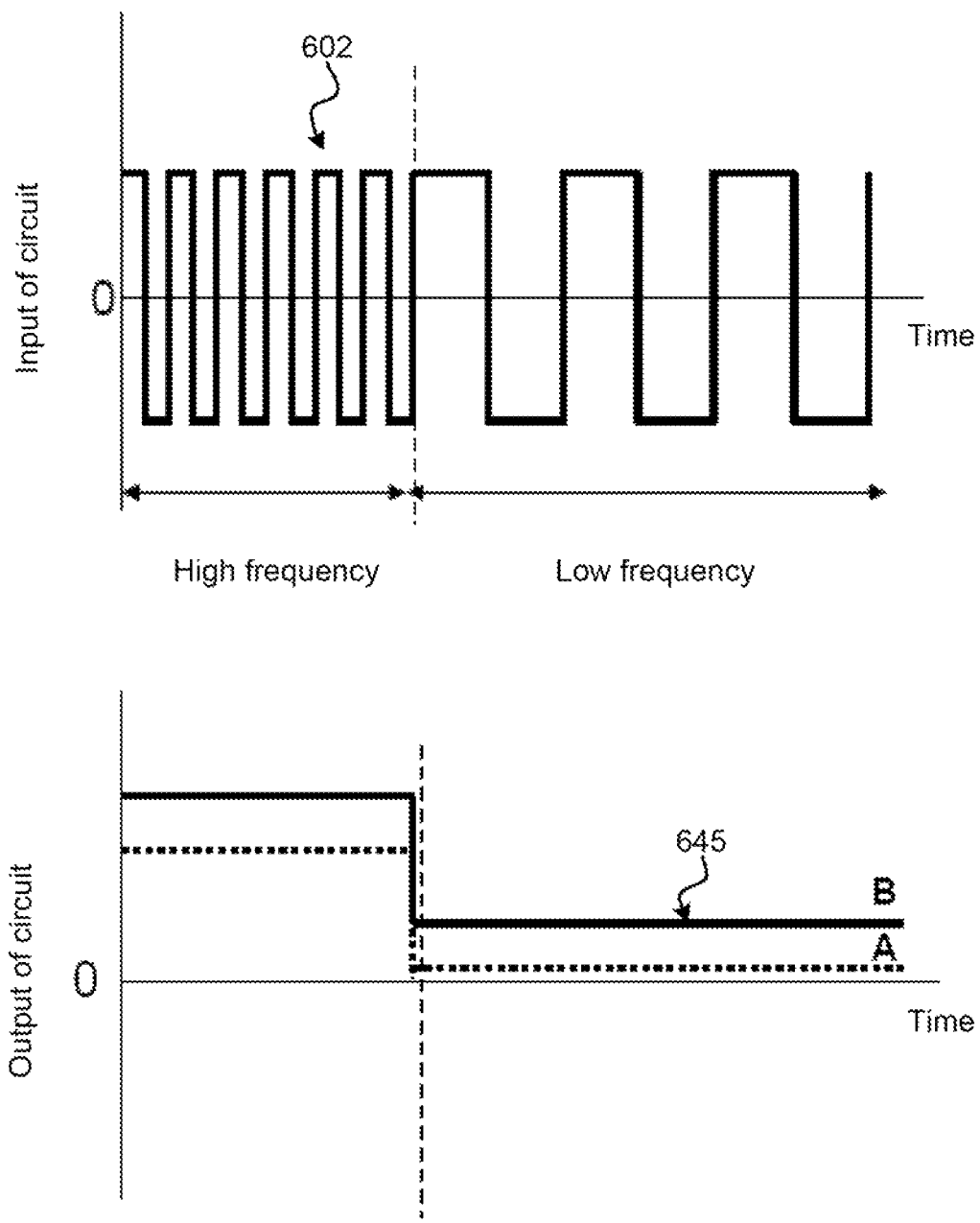
FIG. 8C shows simple charts that depict the change in the output corresponding to input of a circuit, according to one embodiment.

Now referring to FIG. 8C, simple charts for explaining the change in the output signal 618 with respect to the input signal 602 of the circuit are shown according to one embodiment. The top chart in FIG. 8C shows an example of the change in the write data 602, which is the input signal of the circuit. The horizontal axis is time. The first half shows a high-frequency signal, and the last half shows a low-frequency signal. When this type of write data 602 is input to the circuit, the output signal becomes the assist voltage 645 in the lower chart. The thick line indicates case (B) where the rise of the write drive current is slow and a relatively long time is needed. When the frequency is high, a strong assist voltage 645 is output, and when the frequency is low, a weak assist voltage 645 is output. The thick dotted line indicates the case (A) where the rise of the write drive current is fast, and the rise time is short. When the frequency is high, a strong assist voltage 645 is output. When the frequency is low, a weak assist voltage 645 is output. This is the same as B, but the values are smaller in A than in B.

Therefore, the change in the output signal 645 with respect to the input signal 602 of the circuit 601 also has a relationship, according to one embodiment. When the frequency is high, a strong assist voltage 645 is output, and when the frequency is low, a weak assist voltage 645 is output. In some embodiments, the circuit 601 may have a structure that may be turned on/off, may control the energy conversion element 622 by a fixed value as in a conventional technique, and may have compatibility and affinity with conventional drive circuits.

As shown in FIG. 6B, the assist voltage 645 obtained here may pass through a controller, in some approaches, and may be appropriately delayed before being input to the energy conversion element 622.

Referring now to FIGS. 1 and 6A-6B, according to one embodiment, a hard disk drive 100 may comprise a magnetic disk medium 112, a magnetic head 121 adapted for writing data to the magnetic disk medium 112, a mechanism adapted for detecting at least one recording condition of drive current provided to the magnetic head 121 during writing operations, and an energy conversion element 622 for controlling at least one recording characteristic of the magnetic head 121 in response to the at least one detected recording condition.

In further embodiments, the at least one recording characteristic of the magnetic head 121 may be a flying height distance between the magnetic head 121 and the magnetic disk medium 112, and the energy conversion element 622 may be a thermal expansion element (TFC element in one approach) adapted for controlling the flying height distance, wherein the thermal expansion element causes expansion of a portion of the magnetic head 121 due to heat produced by the thermal expansion element.

In more embodiments, the energy conversion element 622 may be a STO element adapted for assisting the magnetic head 121 during writing operations by generating a high harmonic magnetic field from an external magnetic field produced by applying current to the STO.

In another embodiment, the mechanism may be a detection circuit 650 adapted for detecting a signal frequency of the drive current 606. In this embodiment, the detection circuit 650 may be located on the magnetic head 121, on a flexible substrate, on a suspension, etc. In a further approach, the detection circuit may comprise a coil 608, a commutation circuit 612, and a coefficient circuit 614, and any other components shown in FIG. 6A as deemed helpful. In this approach, the detection circuit 650 may be further adapted for applying a control voltage 624 to the energy conversion element 622 based on the detected signal frequency and controlling a polarity of the control voltage 624 (e.g., a sign of the voltage, negative or positive).

In another embodiment, the detection circuit 650 may comprise a PLL circuit 626 and a FV conversion element 630, and any other components shown in FIG. 6B as deemed helpful. In this embodiment, the detection circuit 650 may be further adapted for directly detecting the signal frequency of the drive current 606 from write data 602 provided to the magnetic head 121 during writing operations.

In another approach, the mechanism may be a detection circuit 650 adapted for detecting a linear coefficient of a function of acceleration of the drive current 606. In one approach, the linear coefficient may be the steepness of the rising edge of the speed of the rise of the drive current 606, as would be understood by one of skill in the art. In this approach, the detection circuit 650 may comprise an integrated circuit comprising a coil 608 and a bandpass filter 628, a PLL circuit 626, and a FV conversion element 630, along with any other components shown in FIG. 6B as deemed helpful. The detection circuit 650 may be further adapted for applying a control voltage 645 to the energy conversion element 622 based on the detected linear coefficient of the function of acceleration of the drive current 606, with the control voltage 645 increasing as a difference 637 between an intensity of an obtained harmonic component 633 and a reference signal 635 increases. The obtained harmonic component 633 may be of the signal frequency of the drive current 606 provided to the magnetic head 121 or any other signal related to the magnetic head 121 as would be understood by one of skill in the art upon reading the present descriptions.

In any embodiment described herein, the at least one recording characteristic may comprise at least one of a flying height distance between the magnetic head and the magnetic disk medium, a signal frequency of the drive current, and a linear coefficient of a function of acceleration of the drive current.

Figure 7:
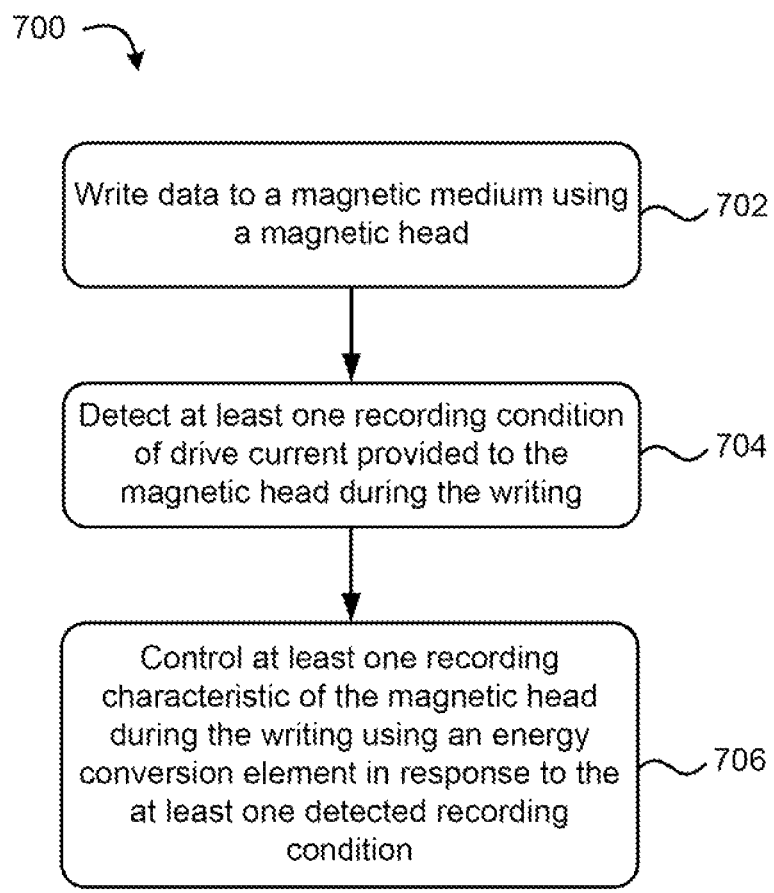
FIG. 7 shows a flowchart of a method for assisted writing, according to one embodiment.

Now referring to FIG. 7, a method 700 is shown according to one embodiment. The method 700 may be carried out in any desired environment, including those shown in FIGS. 1-6B, according to various embodiments. More or less operations than those explicitly described in FIG. 7 may be included in method 700, according to some embodiments.

In operation 702, data is written to a magnetic medium using a magnetic head. The magnetic medium may be a disk medium, such as a hard disk, in one approach. The magnetic head comprises at least one write head for writing data to the magnetic medium, and may include at least one read head, servo head, etc., as would be known to one of skill in the art, according to various embodiments.

In operation 704, at least one recording condition of drive current provided to the magnetic head during the writing is detected.

According to various embodiments, the recording condition may include a flying height distance between the magnetic head and a magnetic disk medium, a high harmonic magnetic field which emanates from an external magnetic field, a signal frequency of the drive current, a linear coefficient of a function of an acceleration of the drive current, or any other recording characteristic as would be appreciated by one of skill in the art upon reading the present descriptions.

In operation 706, at least one recording characteristic of the magnetic head is controlled during the writing using an energy conversion element in response to the at least one detected recording condition.

According to various embodiments, the recording characteristic may include any of the above described recording conditions, and may also include an external magnetic field emanated from a STO, heat produced by a thermal expansion element, etc.

In one embodiment, the at least one recording characteristic of the magnetic head may be the flying height distance, and the energy conversion element may be a thermal expansion element that causes expansion of a portion of the magnetic head due to heat produced by the thermal expansion element.

In another embodiment, the at least one recording characteristic of the magnetic head may be a high harmonic magnetic field which emanates from an external magnetic field, and the energy conversion element may be a STO element which produces the external magnetic field upon current being applied thereto, wherein the high harmonic magnetic field assists the magnetic head during recording operations as described previously.

According to another embodiment, the at least one recording condition may be a signal frequency of the drive current which may be detected using a detection circuit of the magnetic head. In this embodiment, the detection circuit may be located on the magnetic head, on a flexible substrate, on a suspension, or in any other location as would be known to one of skill in the art. Furthermore, in this embodiment, a control voltage may be applied to an energy conversion element adapted to control the at least one recording characteristic of the magnetic head based on the detected signal frequency and a polarity of the control voltage may be controlled.

In one approach, the signal frequency of the drive current may be directly detected from write data provided to the magnetic head.

In another approach, the at least one recording condition may include a linear coefficient of a function of an acceleration of the drive current. In this approach, the at least one recording characteristic may comprise the acceleration of drive current provided to the magnetic head. For example, the linear coefficient may indicate the steepness of the rising edge of the speed of the rise of the drive current. In a further approach, the voltage applied to the energy conversion element may be increased based on a difference between an intensity of an obtained harmonic component and a reference signal increasing. The obtained harmonic component may be of the signal frequency of the magnetic head or any other signal related to the magnetic head, as would be appreciated by one of skill in the art.

In one example, the energy conversion element may be a thermal expansion element adapted for causing expansion of a portion of the magnetic head due to heat produced by the thermal expansion element, and the recording characteristic controlled may be the flying height distance.

In another example, the energy conversion element may be a STO element adapted for producing an external magnetic field (which includes a high harmonic component) upon current being applied thereto, wherein the high harmonic magnetic field assists the magnetic head during recording operations by making it easier to record data to the magnetic medium. In this embodiment, the recording characteristic controlled may be a strength of the high harmonic magnetic field.

Advantages of the embodiments and approaches described herein are numerous. Some advantages include a high signal-to-noise ratio (SNR) and a high error rate (SER) that may be achieved without degrading the reliability when there is contact with the medium for data signals having high-frequency signals higher than about 2 Gbps. Also, the total amount of assist may be reduced and low power consumption may be achieved by appropriately controlling the assist by a low-frequency signal. Through the appropriate assist, reduced jitter during writing and a high track density (high TPI) exceeding 450,000 TPI may be achieved. Other advantages exist as well which are not specifically described herein.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A hard disk drive, comprising:
   a magnetic disk medium;
   a magnetic head configured to write data to the magnetic disk medium;
   a detection circuit configured to detect a recording condition of drive current provided to the magnetic head during writing operations;
   an energy conversion element configured to control a recording characteristic of the magnetic head in response to the detected recording condition,
   wherein the recording condition comprises at least one of a signal frequency of the drive current, and a linear coefficient of a function of acceleration of the drive current, wherein the detection circuit comprises:
an integrated circuit comprising a coil and a bandpass filter;
a phase-locked loop (PLL) circuit; and
a frequency-voltage (FV) conversion element,
wherein the detection circuit is configured to apply a control voltage to the energy conversion element based on the detected recording condition, and
wherein the control voltage increases as a difference between an intensity of an obtained harmonic component and a reference signal increases.

2. The hard disk drive as recited in claim 1, wherein the at least one recording characteristic of the magnetic head is a flying height distance between the magnetic head and the magnetic disk medium, and wherein the energy conversion element is a thermal expansion element configured to control the flying height distance, wherein the thermal expansion element causes expansion of a portion of the magnetic head due to heat produced by the thermal expansion element.

3. The hard disk drive as recited in claim 1, wherein the energy conversion element is a spin-torque oscillator (STO) configured to assist the magnetic head during writing operations by generating a high harmonic magnetic field from an external magnetic field produced by applying current to the STO.

4. The hard disk drive as recited in claim 1, wherein the detection circuit is configured to detect a signal frequency of the drive current.

5. The hard disk drive as recited in claim 4, wherein the detection circuit is located on the magnetic head, on a flexible substrate, or on a suspension.

6. The hard disk drive as recited in claim 4, wherein the detection circuit comprises:
a coil;
a commutation circuit; and
a coefficient circuit, and
wherein the detection circuit is further configured to apply a control voltage to the energy conversion element based on the detected signal frequency and controlling a polarity of the control voltage.

7. The hard disk drive as recited in claim 4, wherein the detection circuit comprises a phase-locked loop (PLL) circuit and a frequency-voltage (FV) conversion element, and wherein the detection circuit is further configured to directly detect the signal frequency of the drive current from write data provided to the magnetic head during writing operations.

8. The hard disk drive as recited in claim 1, wherein the detection circuit is configured to detect a linear coefficient of a function of acceleration of the drive current.

9. The hard disk drive as recited in claim 1, wherein the at least one recording characteristic comprises at least one of: a flying height distance between the magnetic head and the magnetic disk medium, a signal frequency of the drive current, and a linear coefficient of a function of acceleration of the drive current.

10. A method, comprising:
writing data to a magnetic disk medium using a magnetic head, the magnetic head being configured to write data to the magnetic disk medium;
detecting, using a detection circuit, at least one recording condition of drive current provided to the magnetic head during the writing; and
controlling at least one recording characteristic of the magnetic head during the writing using an energy conversion element in response to the at least one detected recording condition, wherein the recording condition comprises at least one of a signal frequency of the drive current, and a linear coefficient of a function of acceleration of the drive current,
wherein the detection circuit comprises:
an integrated circuit comprising a coil and a bandpass filter;
a phase-locked loop (PLL) circuit; and
a frequency-voltage (FV) conversion element,
wherein the detection circuit is configured to apply a control voltage to the energy conversion element based on the detected recording condition, and
wherein the control voltage increases as a difference between an intensity of an obtained harmonic component and a reference signal increases.

11. The method as recited in claim 10, wherein the at least one recording characteristic of the magnetic head is a flying height distance between the magnetic head and the magnetic disk medium, and wherein the energy conversion element is a thermal expansion element that causes expansion of a portion of the magnetic head due to heat produced by the thermal expansion element.

12. The method as recited in claim 10, wherein the at least one recording characteristic of the magnetic head is a high harmonic magnetic field which emanates from an external magnetic field, wherein the energy conversion element is a spin-torque oscillator (STO) which produces the external magnetic field upon current being applied thereto, and wherein the high harmonic magnetic field assists the magnetic head during recording operations.

13. The method as recited in claim 10, wherein the at least one recording condition is a signal frequency of the drive current which is detected using a detection circuit of the magnetic head.

14. The method as recited in claim 13, wherein the detection circuit is located on the magnetic head, on a flexible substrate, or on a suspension.

15. The method as recited in claim 13, further comprising:
applying a control voltage to an energy conversion element configured to control the at least one recording characteristic of the magnetic head based on the detected signal frequency; and
controlling a polarity of the control voltage.

16. The method as recited in claim 13, wherein the signal frequency is directly detected from write data provided to the magnetic head.

17. The method as recited in claim 10, wherein the at least one recording condition is a linear coefficient of a function of an acceleration of the drive current, wherein the at least one recording characteristic comprises the acceleration of drive current provided to the magnetic head.

18. The method as recited in claim 17, further comprising increasing voltage applied to the energy conversion element based on a difference between an intensity of an obtained harmonic component and a reference signal increasing.

19. A device, comprising:
a detection circuit for detecting a recording condition of drive current provided to a magnetic head during writing operations, the detection circuit comprising:
an integrated circuit comprising a coil and a bandpass filter,
a phase-locked loop (PLL) circuit, and
a frequency-voltage (FV) conversion element,
wherein the detection circuit is configured to apply a control voltage to an energy conversion element based on a detected linear coefficient of the function of acceleration of the drive current, the energy conversion element being configured to control a recording characteristic of a magnetic head, and wherein the control voltage increases as a difference between an intensity of an obtained harmonic component and a reference signal increases.

* * * * *